July 4, 1933.                E. B. WIGGINS                1,916,873
APPARATUS FOR CONVERTING INERTIA OF MOVING VEHICLES INTO POWER
Filed April 13, 1931    2 Sheets-Sheet 1
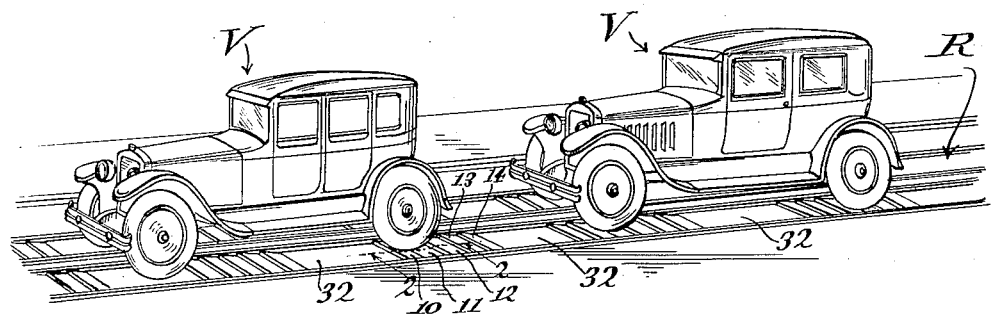
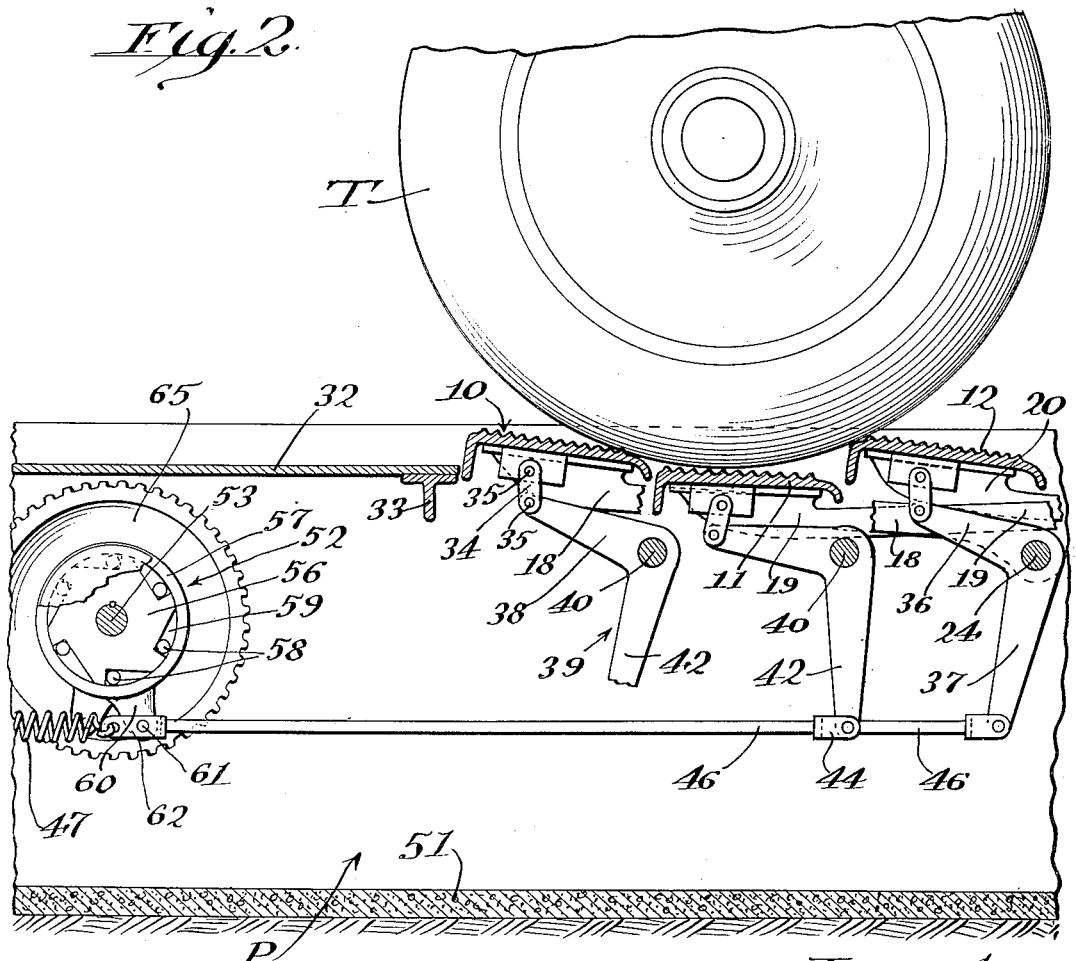
Inventor
Earl B. Wiggins
Edmund A. Strauss
Attorney July 4, 1933.  E. B. WIGGINS  1,916,873
APPARATUS FOR CONVERTING INERTIA OF MOVING VEHICLES INTO POWER
Filed April 13, 1931   2 Sheets-Sheet 2
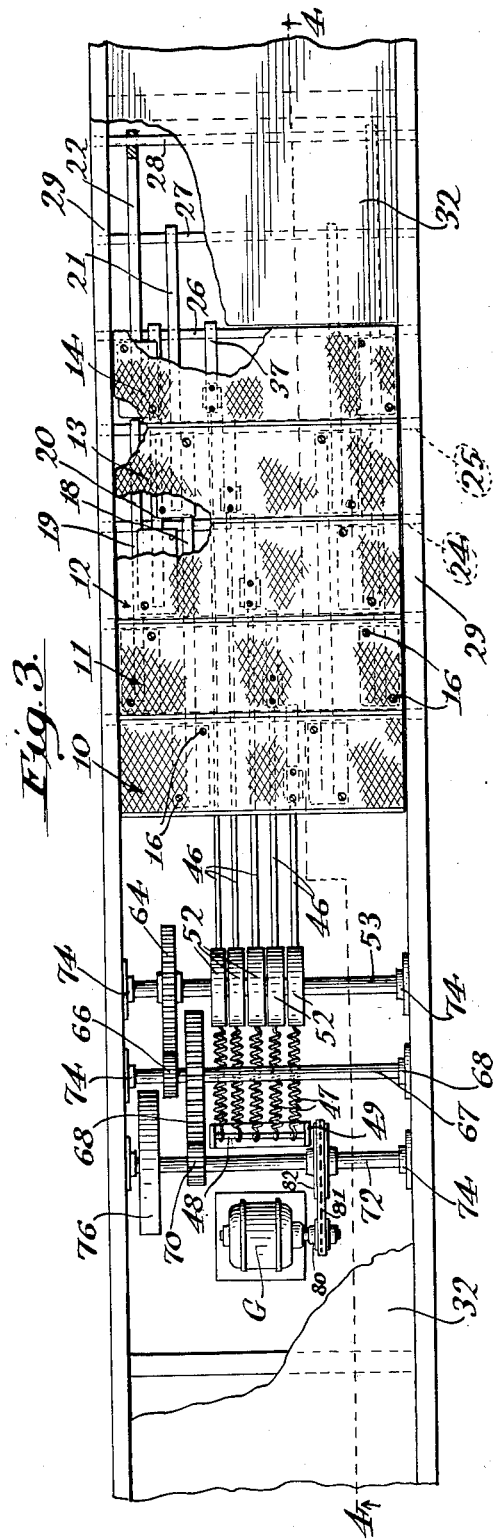
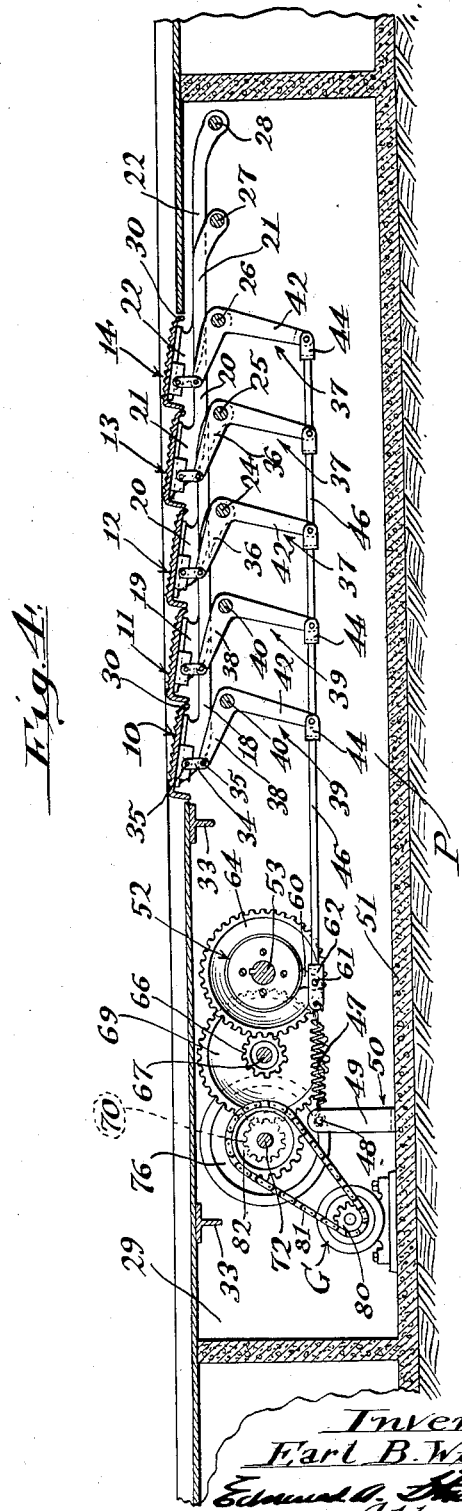
Inventor:
Earl B. Wiggins
Attorney Patented July 4, 1933

1,916,873

UNITED STATES PATENT OFFICE

EARL B. WIGGINS, OF LOS ANGELES, CALIFORNIA

APPARATUS FOR CONVERTING INERTIA OF MOVING VEHICLES INTO POWER

Application filed April 13, 1931. Serial No. 529,753.

This invention relates to means for converting the potential energy of moving vehicles into power available for other purposes, and is an improvement over my co-pending application filed October 21, 1929, Serial No. 401,320.

The object of the present invention is to provide improved means of the character referred to including a plurality of depressible plates interconnected with a series of links and levers arranged in such a manner as to impart rotation to a power take-off shaft through passage of a motor vehicle or the like over said plates.

Other objects and advantages will be apparent from the following description, reference being had to the accompanying drawings, in which—

Fig. 1 is a perspective view illustrating the apparatus of the invention as it appears when installed in a street or roadway.

Fig. 2 is an enlarged vertical section taken on line 2—2 of Fig. 1.

Fig. 3 is a top plan view of the apparatus of the invention, parts being broken away and shown in section.

Fig. 4 is a longitudinal section taken on line 4—4 of Fig. 3.

Referring more specifically to the drawings, the numerals 10, 11, 12, 13, and 14 designate separate plates or treadles which are secured by screws or the like 16 to the outer ends of arms 18, 19, 20, 21, and 22 respectively, pivotally mounted on shafts 24, 25, 26, 27, and 28, rigidly secured to the side walls 29 of a pit —P— disposed below the surface of a roadway —W—.

Each of the plates are disposed in a slightly inclined plane with their lower ends indicated at 30 on substantially the same level with the surface of the cover plates 32, the cover plates rest on beams or the like 33, and extend between each group of treadles.

Plates 12, 13, and 14 are connected by links 34, and pins 35 to arms 36 of quadrants 37 pivotally mounted on the shafts 24, 25, and 26, while the plates 10 and 11 are connected in a similar manner to arms 38 of quadrants 39 pivotally mounted on shafts 40 also secured to the side walls 29.

Connected to the arms 42 of each quadrant by a clevis or the like 44 are links 46, the opposite ends of which are connected to retractile coil springs 47 which in turn are connected to a pin 48 carried by arms 49 of a bracket 50 secured to the bottom 51 of the pit. The springs serve to hold and return the plates to elevated position after they have been depressed by passing of a vehicle thereover.

The links 46 are connected to roller ratchets 52 mounted on a shaft 53 journalled in bearings 74 preferably secured to the side walls 29 of the pit, the ratchets serving to impart rotation to said shaft in one direction.

Referring more specifically to Fig. 2, the roller ratchets are of usual construction, each of which consist of a disk 56 keyed to the shaft 53, a slip ring 57 encircling the disk, and a plurality of rollers 58 mounted in indents 59 formed in the periphery of the disk, the slip rings having arms 60 formed thereon which are connected by pins 61 and clevises 62 to the links 46.

Secured to a shaft 53 is a gear 64 which meshes with a pinion 66 secured to a shaft 67, and secured to the shaft 67 is a gear 69 which meshes with a pinion 70 secured to a power take-off shaft 72, said shafts being journalled in suitable bearings 74, preferably secured to the side walls of the pit.

The above train of gears serve to impart relatively fast rotation to the power take-off shaft, the shaft being provided with a fly wheel 76 which serves to keep it rotating at constant speed.

Rotation of the power take-off shaft may be employed to operate various devices, preferably for generating electric energy, in the present instance, an electric generator designated at —G—, the generator shaft being provided with a sprocket 80 over which passes an endless chain 81 to a drive sprocket 82 secured to the shaft 72.

The above described apparatus forms a unit adapted to be actuated by the movement of a motor vehicle designated at —V—, a plurality of the units being preferably spaced at intervals along the roadway in the path traversed by the wheels of the vehicle, as illustrated in Fig. 1.

During movement of the vehicle the treadles will be depressed by engagement of the tire —T— of the front and rear wheels, the action of which imparts rotation to the power take-off shaft through the quadrants, ratchets, and train of gears above described. It being noted that due to the inclined position the treadles will be depressed successively, the downward movement of which is limited by engagement of the arms connected thereto with the shafts, for example, when the treadle 11 is depressed, the arm 19 engages the shaft 40, as shown in Fig. 2.

It will be understood that the above described apparatus is preferably installed on a roadway or street over which vehicular traffic is more or less continuous.

From the foregoing, it will be seen that the apparatus offers little or no resistance to a vehicle passing thereover, hence no obstruction to the general traffic, yet provides means for converting the energy inherent in the movement of vehicles into power which may be utilized for various purposes.

I claim:

1. An apparatus of the character described comprising in combination, a plate adapted to be mounted above a pit formed in a roadway, a shaft mounted in the pit, an arm pivotally mounted on said shaft and connected to said plate, a pivotally mounted quadrant, means connecting one arm of said quadrant to said plate, a second shaft, a roller ratchet including a disk secured to said second shaft and a slip ring thereon, a link connected to the other arm of the quadrant and to the slip ring of the ratchet, spring means connected to said link for normally holding said plate in elevated position, a power take-off shaft, a gear mounted on said second shaft, an idler shaft, a pinion on said idler shaft meshing with the gear on second shaft, and a gear on the idler shaft meshing with a pinion on the power take-off shaft.

2. An apparatus of the character described comprising a plurality of shafts, a pair of arms pivotally mounted on each of said shafts, a plate connected to the outer ends of each pair of said arms, said plates being arranged in a row with their faces disposed in an inclined plane, quadrants pivotally mounted on said shafts, a second shaft, a plurality of ratchets including disks secured to said second shaft and slip rings engaging the disks, links connecting one arm of each of said quadrants to said plates, links connecting the other arm of said quadrants to the slip ring of said ratchets, a power take-off shaft, and multiple gearing arranged between said second shaft and power take-off shaft.

In testimony whereof I affix my signature.

EARL B. WIGGINS.